United States Patent [19]

Beccaris

[11] Patent Number: 4,613,029
[45] Date of Patent: Sep. 23, 1986

[54] TORSION DAMPING DEVICE FOR AN AUTOMOBILE CLUTCH FRICTION DISC

[75] Inventor: Carlo Beccaris, Santena, Italy
[73] Assignee: Valeo, Paris, France
[21] Appl. No.: 639,536
[22] Filed: Aug. 9, 1984

Related U.S. Application Data

[63] Continuation of Ser. No. 324,942, Nov. 24, 1981, abandoned.

[30] Foreign Application Priority Data

Dec. 16, 1980 [FR] France ................... 80 26642

[51] Int. Cl.$^4$ ............ F16D 3/14; F16D 3/66; F16D 3/68; F16D 13/38
[52] U.S. Cl. ............... 192/106.2; 192/30 V; 192/70.17; 192/106.1; 464/68; 464/85
[58] Field of Search ............ 192/106.1, 106.2, 30 V, 192/70.17; 464/68, 66, 85, 81

[56] References Cited

U.S. PATENT DOCUMENTS

| 1,912,703 | 6/1933 | Gamble | 192/106.1 |
| 2,221,823 | 11/1940 | Thelander | 192/106.2 |
| 4,197,931 | 4/1980 | Norcia | 192/106.2 |
| 4,212,380 | 7/1980 | Billet | 464/68 |

FOREIGN PATENT DOCUMENTS

| 0492985 | 3/1930 | Fed. Rep. of Germany | 464/85 |
| 2727725 | 1/1979 | Fed. Rep. of Germany | 192/106.2 |
| 2020215 | 10/1970 | France . | |
| 2386729 | 3/1978 | France . | |
| 2371609 | 7/1978 | France | 192/106.1 |
| 2371608 | 7/1978 | France | 192/106.2 |
| 55-20936 | 2/1980 | Japan | 192/106.2 |
| 971094 | 9/1964 | United Kingdom | 464/85 |
| 1233273 | 5/1971 | United Kingdom . | |
| 863916 | 9/1981 | U.S.S.R. | 192/106.1 |

Primary Examiner—Rodney H. Bonck
Attorney, Agent, or Firm—Young & Thompson

[57] ABSTRACT

A torsion damping device for an automobile clutch friction disc comprises two coaxial parts angularly movable relative to one another to a limited extent in opposition to the action of first helicoidal springs disposed between the parts, these first springs damping vibrations between the clutch drive and driven shafts. One of the coaxial parts comprises a coaxial web and hub themselves angularly movable relative to one another over a limited sector defined by complementary toothings on the web and hub. Second helicoidal springs are disposed between the web and hub to oppose their relative angular movement, damping noise when in neutral gear. At least one block of elastomeric material is disposed between the toothings on the web and hub, the or each block allowing the toothings to strike positively against one another but braking their relative motion to reduce noise when torque in the clutch is reversed. The or each block comprises a ring engaged around one of the teeth of one of the toothings and disposed in a groove in that tooth, so that the ring is compressed by the neighboring teeth of the other toothing.

6 Claims, 8 Drawing Figures

FIG. 2
FIG. 3
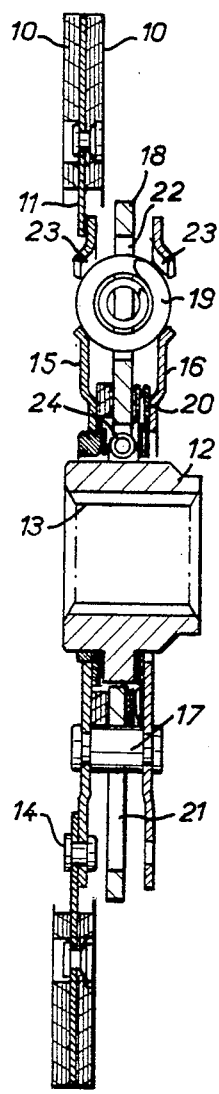
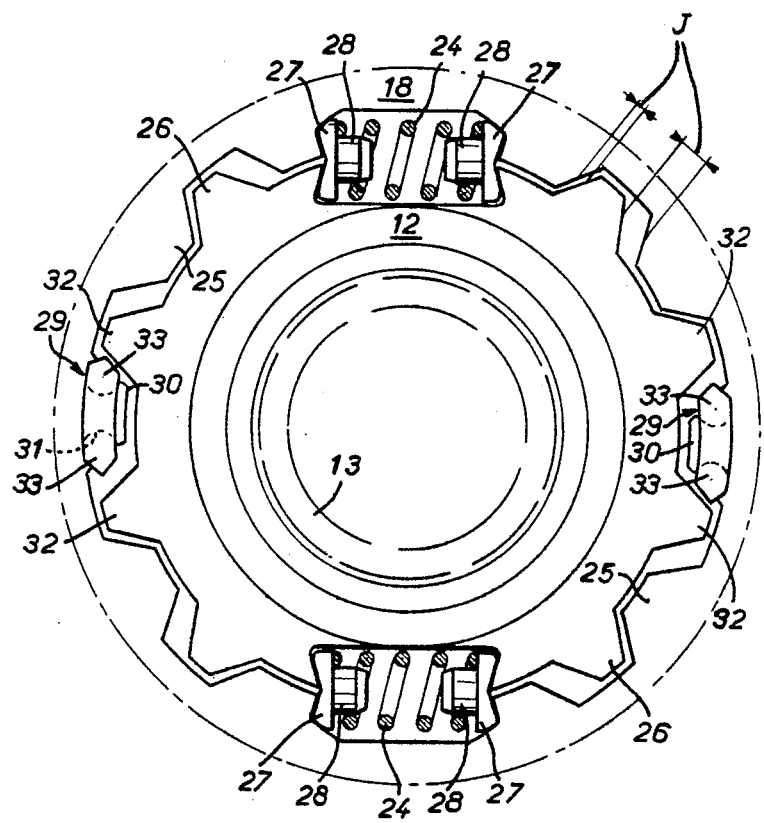

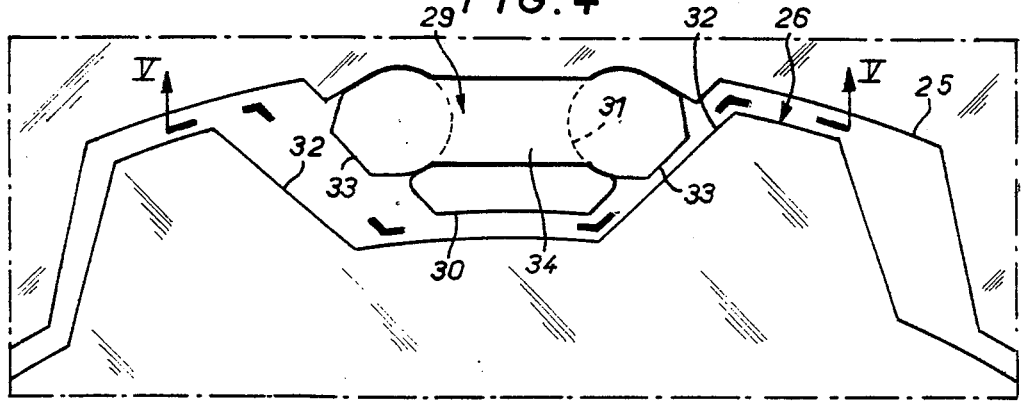
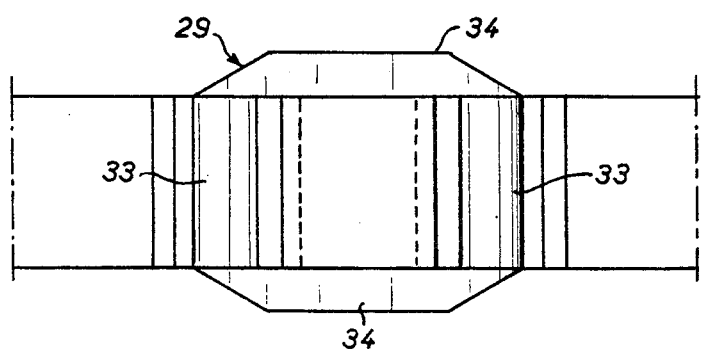
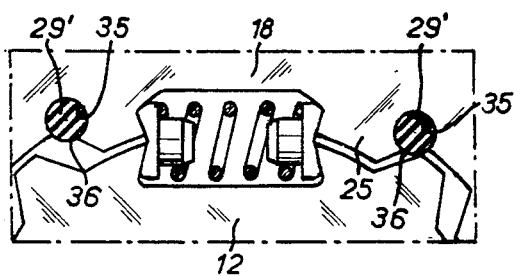
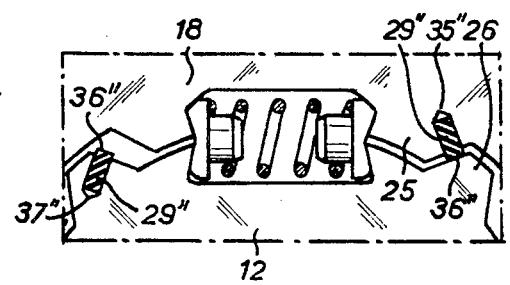
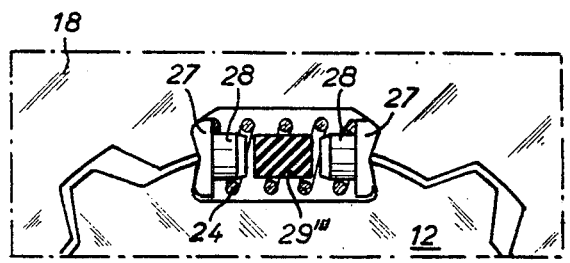

TORSION DAMPING DEVICE FOR AN AUTOMOBILE CLUTCH FRICTION DISC

This application is a continuation of application Ser. No. 324,942 filed Nov. 24, 1981 now abandoned.

BACKGROUND OF THE INVENTION

The present invention relates to a torsion damping device for an automobile clutch friction disc, comprising two coaxial parts adapted to move angularly relative to one another through a limited displacement against the action of first resilient means, one of said parts comprising a web and a hub which are coaxial and are movable angularly relative to one another against the action of second resilient means within a sector of angular displacement defined by complementary toothings of the web and hub, the toothings having circumferential play therebetween.

A torsion damping device of this kind makes it possible to achieve regulated transmission between one of the parts, which is associated with an input shaft, and the other part, which is associated with an output shaft, in order to prevent the generation of vibrations, particularly acoustic vibrations, along the entire kinematic chain in which the torsion damping device is inserted.

This is the purpose of the resilient means which oppose an angular displacement between the two parts of the torsion damping device.

With regard to the second resilient means, which oppose the angular displacement between the web and the hub, their purpose is to prevent the production of various noises, for example gearbox noise, which is also called "neutral" noise, when the torque transmitted is zero or low.

Torsion damping devices of this kind, which comprise first resilient means and second resilient means, are generally satisfactory under various operating conditions. However, it has been found that when the torque is reversed in the course of operation the complementary toothings of the web and hub, which toothings have circumferential play therebetween, are liable to clash noisily.

It is an object of the present invention to provide a torsion damping device for an automobile clutch friction disc of the type indicated above, in which this disadvantage is minimized or eliminated and in which the circumferential striking action of the toothings of the web and hub against one another is softened, without impairing its effectiveness.

SUMMARY OF THE INVENTION

According to the invention a torsion damping device of the type indicated above is characterised in that third resilient means are provided and consist of at least one block of elastomeric material interposed between the web and the hub and adapted to enable the toothings of the web and hub to strike circumferentially against one another with a noise-reducing braking effect.

As the result of this arrangement, the toothings of the web and of the hub are allowed to strike positively against one another, but the block of elastomeric material softens this striking and prevents noise.

A plurality of blocks are preferably provided and are disposed with circular symmetry.

In one embodiment each block consists of a ring engaged around one of the teeth of one of the toothings, in a groove in that tooth, and is adapted to be compressed by neighbouring teeth of the other toothing.

As an alternative, the block is contained in a socket provided in one of the toothings and has a projecting portion which cooperates in respect of compression with the other toothing.

In another alternative embodiment the block is disposed inside the second resilient means consisting of a helicoidal spring.

BRIEF DESCRIPTION OF THE DRAWINGS

FIG. 2 is a view of this friction disc in axial section on the broken line II—II in FIG. 1;

FIG. 3 is a view in elevation, on a larger scale, of a central region of the friction disc shown in FIG. 1 and illustrates the blocks according to the invention;

FIG. 4 is a view, on a larger scale, of a detail of FIG. 3, and shows more particularly one of these blocks;

FIG. 5 is a corresponding view of this block on the broken line V—V in FIG. 4;

FIGS. 6, 7 and 8 are partial views similar to FIG. 3, but show respectively three alternative forms of blocks.

DESCRIPTION OF THE PREFERRED EMBODIMENTS

Figure 1:
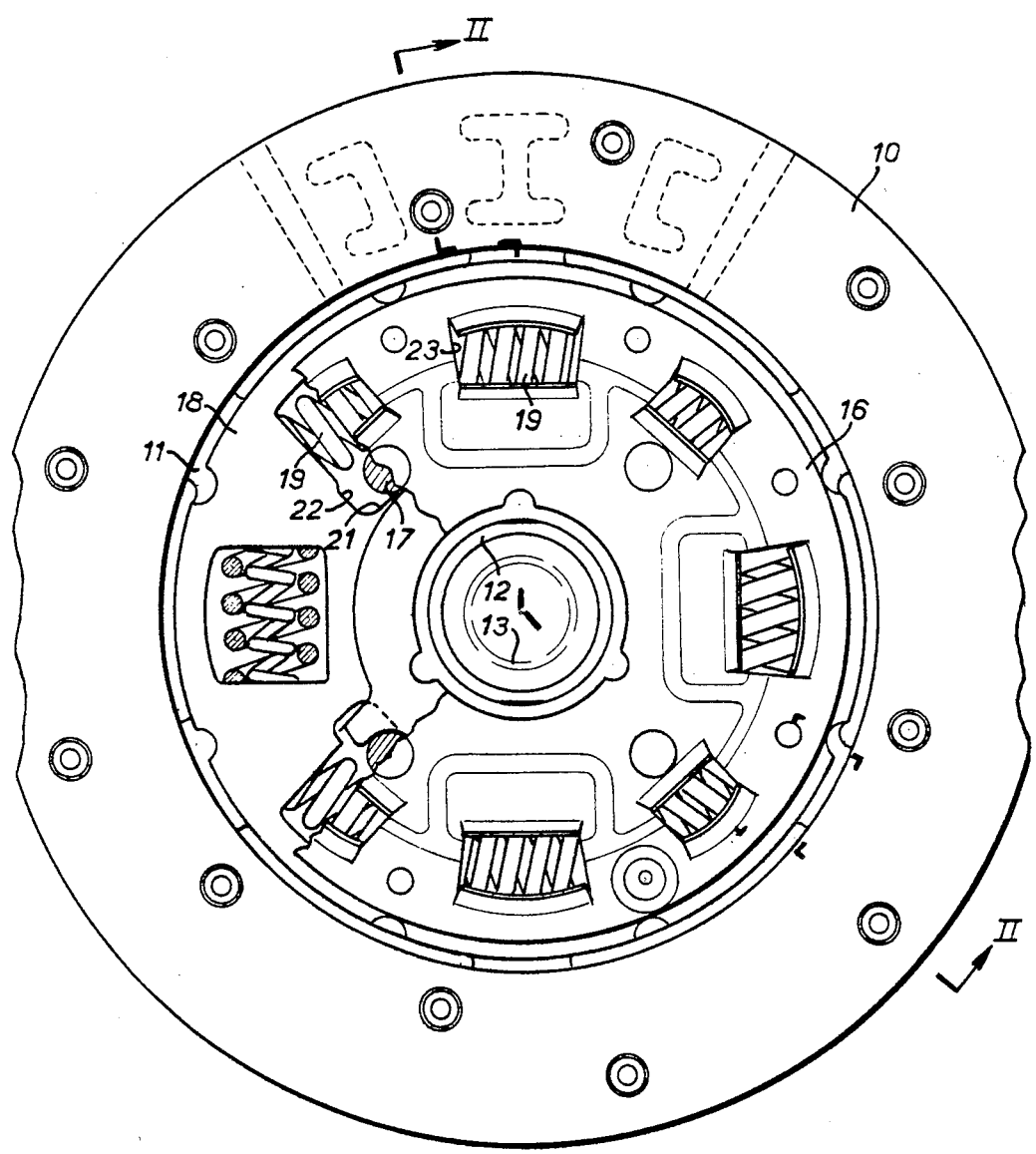
FIG. 1 is a partial view in elevation, partly broken away, of a friction disc incorporating a torsion damping device according to the invention.

One embodiment of the present invention is illustrated in FIGS. 1 to 5.

At 10 can be seen the linings of the friction disc, which are mounted on an annular plate 11, and at 12 can be seen the hub of the friction disc. The linings 10 carried by the plate 11 are adapted to be gripped between two plates rotationally fast with a drive shaft (not shown), while the hub 12 is adapted to be engaged, by means of splines 13, on a driven shaft (not shown) forming the input shaft of the gearbox of the motor vehicle.

The lining carrier plate 11 is fixed by rivets 14 on a washer 15, known as the guide washer, while another guide washer 16, spaced apart from the washer 15, is fastened to the latter by posts 17. The guide washers 15 and 16 are mounted for rotation about the hub 12. A web 18 is disposed between the guide washers 15 and 16 and is mounted for rotation relative to the hub 12.

The torsion damping device incorporated in the friction disc comprises two coaxial parts which are movable angularly relative to one another.

One of these parts comprises the guide washers 15 and 16 and the plate 11 carrying the linings 10. The other part comprises the web 18 and the hub 12.

The two parts 15, 16, 11, 10 and 18,12 are movable angularly in relation to one another over a limited path in opposition to the action of first resilient means 19 and in opposition to the action of friction means 20. The angular movement between these two parts is limited by the abutment of the posts 17 in cutouts 21 provided in the web 18, and/or by the complete compression of the springs.

The first resilient means 19 comprise a plurality of helicoidal springs which are accommodated in openings 22 in the web and in openings 23 in the guide washers 15 and 16. The cutouts 21 may be formed by extending the openings 22 towards the axis of the friction disc. The friction means 20 consist of one or more resiliently calibrated washers inserted between the web 18 and the guide washers 15 and 16.

The part 18,12 of the torsion damping device itself comprises two coaxial parts, namely the web 18 and the hub 12, which are movable angularly relative to one another in opposition to the action of second resilient means 24 within a sector of angular displacement defined by complementary toothings 25 and 26 on the web 18 and hub 12 respectively and having circumferential play J therebetween.

The second resilient means 24 comprise helicoidal springs interposed between the web 18 and the hub 12 with the aid of support plates 27 having centering studs 28 for the helicoidal springs 24.

The complementary toothings 25 and 26 of the web 18 and of the hub 12 are adapted to strike positively against one another in opposition to the action of the helicoidal springs 24.

It is both the first resilient means, comprising the springs 19, and also the friction means, comprising the washers 20, which are interposed between the part 15,16, 11,10 and the part 18,12 of the torsion damping device and which essentially serve the purpose of damping the vibrations which may occur between the drive shaft and the driven shaft.

The second resilient means 24 interposed between the web 18 and the hub 12 essentially serve the purpose of preventing noise, such as gearbox or "neutral" noise, when the torque transmitted by the torsion damping device is zero or low.

However, when in the course of operation the torque is reversed, the toothings 25 and 26 of the web 18 and hub 12 may strike against one another violently and noisily.

Third resilient means are provided to eliminate or minimize this drawback.

These third resilient means consist of a plurality of blocks 29 of elastomeric material interposed between the web 18 and the hub 12 and adapted to allow the toothings 25 and 26 of the web 18 and hub 12 to strike circumferentially against one another yet with a noise-reducing braking action.

These blocks 29 of elastomeric material are preferably disposed with circular symmetry. In the example shown in FIG. 3, two blocks 29 are thus provided in diametrically opposite positions.

In the example shown in FIGS. 1 to 5, each block 29 of elastomeric material comprises a ring engaged around one tooth 30 of the toothing 25 of the web 18. This tooth 30 has a groove 31 in which the ring 29 is engaged. The ring 29 is adapted to be compressed by the neighbouring teeth 32 of the toothing 26 of the hub 12.

More particularly, as can be seen in FIGS. 4 and 5, the ring 29 has a generally rectangular shape with two opposite beads 33 intended to be compressed by the teeth 32. These beads 33 are connected together by two webs 34.

When the torque transmitted by the torsion damping device is zero or low, the second resilient means 24 act effectively to prevent "neutral" or gearbox noise.

However, when in the course of operation a reversal of torque occurs and the toothings 25 and 26 of the web 18 and hub 12 are allowed to strike against one another, the rings 29, while permitting this striking action, have the effect of softening it and of eliminating or reducing the noise which it could cause.

It will be appreciated that the ring 29 mounted on the tooth 30 of the toothing 25 withstands centrifugal force particularly well, but it would also be possible to mount the ring 29 around one of the teeth of the toothing 26 on the hub 12, instead.

As an alternative (FIG. 6), an arrangement is used which is similar to that just described with reference to FIGS. 1 to 5, but in which the blocks, designated 29', are accommodated in a socket 35 provided in one of the toothings 25 and 26, for example the toothing 25 in the case of FIG. 6. Each block 29' has a projecting portion 36 which cooperates, by compression, with the other toothing 26. In the example shown in FIG. 6 the blocks 29' are round in shape.

In the variant shown in FIG. 7 the arrangement is similar to that just described with reference to FIG. 6, and the blocks designated 29" are once again accommodated in sockets. One of these sockets 35" is provided in the toothings 25, while another, designated 37", is provided in the toothing 26. In the example shown in FIG. 7, the blocks 29" in the toothings 25 and 26 have the shape of cylindrical pegs and have a projecting portion 36" which cooperates with the other respective toothing.

Reference will now be made to FIG. 8, in which the arrangement is again similar to those previously described, but in which each block, designated 29''', is disposed inside one of the helicoidal springs comprising the second resilient means 24 and extends between the studs 28 with a predetermined clearance therebetween.

I claim:

1. A torsion damping device for an automobile clutch friction disc, comprising two coaxial parts adapted for limited relative movement therebetween, first resilient means for opposing the relative movement between said two parts, one of said two parts comprising a web element and a hub coaxial therewith, complementary toothings, each comprising a plurality of teeth, being provided on said web element and on said hub, said web element and said hub being adapted for relative angular movement therebetween, which movement is limited to a sector of angular displacement defined by said complementary toothings, second resilient means for opposing the relative movement between said web element and said hub and third resilient means, comprising at least one block of elastomeric material interposed between the web element and the hub, said third resilient means being adapted to allow a positive circumferential striking action of the toothing of said web element against the toothing of said hub, but braking the relative movement between the complementary toothings to reduce noise caused by said striking action, said at least one block comprising a ring engaged around one of the teeth of one of the said toothings and disposed in a groove in that tooth, said ring being adapted to be compressed by the neighbouring teeth of the other toothing.

2. A device according to claim 1, wherein said ring is engaged around a tooth of the toothing of the web element and cooperates by compression with the toothing of the hub.

3. A device according to claim 1, wherein said ring has a generally rectangular shape, and comprises two compressible opposite beads connected by two webs.

4. A device according to claim 1, further comprising friction means, said two coaxial parts being movable angularly relative to one another in opposition to the action of both said first resilient means and said friction means.

5. A device according to claim 1, wherein a plurality of said blocks are provided.

6. A device according to claim 5, wherein said blocks are disposed with circular symmetry.

* * * * *